United States Patent
Huang et al.

(10) Patent No.: US 12,409,640 B2
(45) Date of Patent: Sep. 9, 2025

(54) WATERPROOFING AND BREATHABLE POLYOLEFIN ROOFING MEMBRANE BY EXTRUSION LAMINATION AND SEQUENTIAL STRETCHING

(71) Applicants: DDP SPECIALTY ELECTRONIC MATERIALS US, LLC., Wilmington, DE (US); EIDCA SPECIALTY PRODUCTS COMPANY, Kingston (CA); DUPONT (CHINA) RESEARCH & DEVELOPMENT AND MANAGEMENT CO., LTD., Shanghai (CN)

(72) Inventors: Wenyi Huang, Wilmington, DE (US); Lisa Bertolo, Kingston (CA); Jiaqi Wang, Shanghai (CN)

( * ) Notice: Subject to any disclaimer, the term of this patent is extended or adjusted under 35 U.S.C. 154(b) by 155 days.

(21) Appl. No.: 18/312,123

(22) Filed: May 4, 2023

(65) Prior Publication Data
US 2023/0356516 A1     Nov. 9, 2023

(51) Int. Cl.
B32B 27/12     (2006.01)
B29C 48/00     (2019.01)
(Continued)

(52) U.S. Cl.
CPC .......... *B32B 27/12* (2013.01); *B29C 48/0018* (2019.02); *B29C 48/07* (2019.02); *B29C 48/154* (2019.02); *B29C 71/02* (2013.01); *B32B 5/022* (2013.01); *B32B 27/32* (2013.01); *B32B 37/153* (2013.01); *B32B 38/0012* (2013.01); *B32B 38/0036* (2013.01); *B29C 2071/022* (2013.01);
(Continued)

(58) Field of Classification Search
CPC ... E04D 5/10; B32B 2419/06; B32B 2323/10; B32B 2307/748; B32B 2307/7246; B32B 2307/718; B32B 2307/54; B32B 2307/518; B32B 2307/516; B32B 2305/18; B32B 2270/00; B32B 2262/0276; B32B 2262/0253; B32B 2260/046; B32B 2260/021; B32B 2250/40
See application file for complete search history.

(56) References Cited

U.S. PATENT DOCUMENTS 3,426,754 A   2/1969   Bierenbaum et al.
3,801,404 A   4/1974   Druin et al.
(Continued)

FOREIGN PATENT DOCUMENTS

EP   927096 B1    5/2005
EP   3593988 A1   1/2020
(Continued)

OTHER PUBLICATIONS

PCT International Search Report for Application No. PCT/US2023/019246; Erik Koning, Authorized Officer; ISA/EPO; Sep. 4, 2023.

*Primary Examiner* — Vishal I Patel

(57) ABSTRACT

Reinforced microporous polyolefin sheets comprise one or more layers of a microporous polyolefin and a non-woven fabric at least partially embedded in the microporous polyolefin. The reinforced microporous polyolefin sheet is made in an extrusion lamination process by which a polyolefin sheet and non-woven fabric are laminated, followed by sequential cold and hot stretching steps to produce the micropores.

22 Claims, 3 Drawing Sheets

(51) Int. Cl.
  *B29C 48/07* (2019.01)
  *B29C 48/154* (2019.01)
  *B29C 71/02* (2006.01)
  *B32B 5/02* (2006.01)
  *B32B 27/32* (2006.01)
  *B32B 37/15* (2006.01)
  *B32B 38/00* (2006.01)
  B29K 23/00 (2006.01)
  B29K 105/00 (2006.01)
  E04D 5/10 (2006.01)

(52) U.S. Cl.
  CPC ...... *B29K 2023/06* (2013.01); *B29K 2023/12* (2013.01); *B29K 2105/0088* (2013.01); *B29K 2713/00* (2013.01); *B32B 2038/0028* (2013.01); *B32B 2038/0048* (2013.01); *B32B 2250/40* (2013.01); *B32B 2260/021* (2013.01); *B32B 2260/046* (2013.01); *B32B 2262/0253* (2013.01); *B32B 2262/0276* (2013.01); *B32B 2262/124* (2021.05); *B32B 2270/00* (2013.01); *B32B 2305/18* (2013.01); *B32B 2307/516* (2013.01); *B32B 2307/518* (2013.01); *B32B 2307/54* (2013.01); *B32B 2307/718* (2013.01); *B32B 2307/7246* (2013.01); *B32B 2307/7376* (2023.05); *B32B 2307/748* (2013.01); *B32B 2323/10* (2013.01); *B32B 2419/06* (2013.01); *E04D 5/10* (2013.01)

(56) References Cited

U.S. PATENT DOCUMENTS

| | | | |
|---|---|---|---|
| 3,843,761 A | * | 10/1974 | Bierenbaum ............. C08J 5/18 264/41 |
| 4,368,565 A | | 1/1983 | Schwarz |
| 5,028,289 A | | 7/1991 | Rasmussen |
| 6,843,949 B2 | | 1/2005 | Brady et al. |
| 8,337,190 B2 | | 12/2012 | Curro et al. |
| 2006/0148354 A1 | | 7/2006 | Shelley et al. |
| 2012/0321856 A1 | | 12/2012 | Afshari |
| 2021/0095110 A1 | * | 4/2021 | Huang ................... C08L 23/06 |

FOREIGN PATENT DOCUMENTS

| | | |
|---|---|---|
| WO | 01/51546 A1 | 7/2001 |
| WO | 2004/011251 A1 | 2/2004 |

* cited by examiner

WATERPROOFING AND BREATHABLE POLYOLEFIN ROOFING MEMBRANE BY EXTRUSION LAMINATION AND SEQUENTIAL STRETCHING

BACKGROUND OF THE INVENTION

Field of the Invention. This invention relates to breathable polymeric membranes and methods for making them.

Description of Related Art. Breathable membranes are films that are permeable to water vapor and other gasses but nonetheless are highly impermeable to liquids. These find use in the construction industry, such as in the form of housewraps. Breathable housewraps function as a weather-resistant barrier, preventing water from passing through the wall assembly while allowing water vapor to escape. Other uses include backsheets for hygiene absorbent products such as diapers, medical filtration applications, medical dressings, medical packaging and medical back table cover applications.

Breathability results from micropores in the film. The micropores can be produced in several ways. They sometimes result from interstitial spaces between fibers that make up the film, as is the case with plexifilamentary film (such as Tyvek® film from DuPont). Micropores can also be formed mechanically, or by using laser methods.

Stretching methods can be used to produce the micropores. For example, U.S. Pat. Nos. 3,801,404 and 3,426,754 describe stretching semi-crystalline polymers to produce micropores. More recently, U.S. Published Patent Application No. 2021/0095110 describes certain polypropylene copolymer films that are sequentially cold-stretched and hot-stretched to produce micropores. Although this last document mentions roofing membranes as a potential application for the film, in fact the microporous polypropylene copolymer films by themselves often lack the mechanical properties and other performance characteristics that are required of roofing membranes. Roofing membranes are generally thicker sheets, typically having thicknesses of 1 mm or more, and must meet strength, elongation and other mechanical requirements in addition to having the requisite water barrier and breathability requirements. In addition, roofing membranes are generally manufactured as roll goods that must be joined along seams to produce a continuous, leak-free water barrier. The industry-preferred method of doing this is thermal welding, and so the roof membrane, in addition to these other needed attributes, needs to be easily weldable at reasonable welding temperatures.

US 2021/0095110 mentions that laminates can be formed by marrying the microporous polypropylene copolymer films to various fabrics, using methods such as thermal calendar point bonding, adhesive lamination and ultrasonic bonding.

BRIEF SUMMARY OF THE INVENTION

This invention relates to a method for forming a reinforced microporous polyolefin sheet, comprising the steps of:
  a) extrusion laminating a non-porous sheet of a polyolefin onto at least one side of a non-woven fabric to produce a non-porous laminate having a thickness of at least 1 mm, the non-porous laminate comprising the non-woven fabric at least partially embedded in the polyolefin, then
  b) subjecting the non-porous laminate to sequential stretching steps to produce micropores in the polyolefin, the stretching steps comprising
    1) at least one cold stretching step at a temperature in the range of −20° C. to 50° C. and
    2) at least one hot stretching step at a temperature greater than 50° C. and up to 150° C.,
  wherein the non-woven fabric has an areal weight of 100 to 400 g/m$^2$, a thickness of 0.25 to 0.95 mm under a load of 2 kN/m$^2$, and an elongation at break of 30 to 200% in each of machine and cross directions and
  wherein the polyolefin is a phase-segregated polymer that comprises a continuous phase comprising a polypropylene homopolymer, and a dispersed phase comprising an ethylene-propylene copolymer having a glass transition temperature of −30° C. or lower, the dispersed phase further containing inclusions of a polypropylene homopolymer.

In another aspect, this invention relates to a method for forming a reinforced microporous polyolefin sheet, comprising the steps of:
  a) extrusion laminating a non-porous sheet of a polyolefin onto at least one side of a non-woven fabric to produce a non-porous laminate having a thickness of at least 1 mm, the non-porous laminate comprising the non-woven fabric at least partially embedded in the polyolefin, then
  b) subjecting the non-porous laminate to sequential stretching steps to produce micropores in the polyolefin, the stretching steps comprising
    1) at least one cold stretching step at a temperature in the range of −20° C. to 50° C. and
    2) at least one hot stretching step at a temperature greater than 50° C. and up to 150° C.,
  wherein the non-woven fabric has an areal weight of 100 to 400 g/m$^2$, a thickness of 0.25 to 0.95 mm under a load of 2 kN/m$^2$, and an elongation to break of 30 to 200% in each of machine and cross directions and
  wherein the polyolefin comprises
    (i) 50 to 95 weight percent of one or more polypropylene homopolymer chain segments, based on the weight of the polyolefin or 43 to 79 mole percent polypropylene homopolymer chain segments based on the mold content of polymerized units of polypropylene in the polypropylene homopolymer chain segments as a percentage of the total mole content of polymerized monomer units in the polyolefin and
    (ii) 5 to 50 weight percent of ethylene-containing copolymer chain segments based on the weight of the polyolefin, or 21 to 57 mole percent of ethylene-containing chain segments based on the mole content of polymerized monomer units in the ethylene-containing copolymer chain segments as a percentage of the total mole content of polymerized monomer units in the polyolefin,
  wherein at least a portion of the ethylene-containing copolymer chain segments comprise polymerized units of ethylene in an amount of at least 45 weight percent based on the weight of the ethylene-containing copolymer chain segments, or at least 55 mole percent based on the mole content of polymerized units of ethylene in the ethylene-containing chain segments as a percentage of the total mole content of polymerized monomer units in the ethylene-containing copolymer chain segments.

Very surprisingly, the non-porous laminate formed in step a) produces, when stretched according to step b), a reinforced microporous sheet that exhibits excellent breathability yet is an effective barrier to liquid water. Despite the presence of the non-woven fabric, the non-porous laminate produced in step a) can be stretched under each of the cold and hot stretching conditions to produce the micropores. Even more surprisingly, this micropore formation is accomplished without producing significant defects at the interface of the non-woven fabric fibers and the polyolefin. The polyolefin does not significantly pull away from the fabric fibers during the stretching process. The process of the invention permits the production of thick, microporous sheets that have mechanical and other properties rendering them useful as roofing membranes and for other purposes.

In another aspect, this invention relates to a reinforced microporous polymer sheet having a thickness of at least 1 mm comprising a non-woven fabric embedded in a microporous polyolefin,
  wherein the non-woven fabric has an areal weight of 100 to 400 g/m², a thickness of 0.25 to 0.95 mm under a load of 2 kN/m², and an elongation at break of 30 to 200% in each of machine and cross directions and
  wherein the polyolefin is a phase-segregated polymer that comprises a continuous phase that comprises a polypropylene homopolymer and a dispersed polyolefin phase comprising an ethylene-propylene copolymer having a glass transition temperature of −30° C. or lower, the dispersed phase further containing inclusions of a polypropylene homopolymer.

In yet another aspect, this invention also relates to a reinforced microporous polymer sheet having a thickness of at least 1 mm comprising a non-woven fabric embedded in a microporous polyolefin
  wherein the non-woven fabric has an areal weight of 100 to 400 g/m², a thickness of 0.25 to 0.95 mm under a load of 2 kN/m², and an elongation to break of 30 to 200% in each of machine and cross directions and
  wherein the polyolefin comprises
    (i) 50 to 95 weight percent of one or more polypropylene homopolymer chain segments, based on the weight of the polyolefin, or 43 to 79 mole percent polypropylene homopolymer chain segments based on the mold content of polymerized units of polypropylene in the polypropylene homopolymer chain segments as a percentage of the total mole content of polymerized monomer units in the polyolefin, and
    (ii) 5 to 50 weight percent of ethylene-containing copolymer chain segments based on the weight of the polyolefin, or 21 to 57 mole percent of ethylene-containing chain segments based on the mole content of polymerized monomer units in the ethylene-containing copolymer chain segments as a percentage of the total mole content of polymerized monomer units in the polyolefin, and
  wherein at least a portion of the ethylene-containing copolymer chain segments comprise polymerized units of ethylene in an amount of at least 45 weight percent based on the weight of the ethylene-containing copolymer chain segments, or at least 55 mole percent based on the mole content of polymerized units of ethylene in the ethylene-containing chain segments as a percentage of the total mole content of polymerized monomer units in the ethylene-containing copolymer chain segments.

DETAILED DESCRIPTION OF THE INVENTION

The polyolefin in some embodiments of the invention is a phase-segregated polymer that includes a continuous phase that comprises a polypropylene homopolymer, and a dispersed phase. The dispersed phase is in the form of discrete domains observable by transmission electron microscopy (TEM) according to the method described in paragraph [0173] of US 2021/0095110 A1, or equivalent method. The dispersed phase comprises an ethylene-propylene copolymer that has a glass transition temperature of −30° C. or lower (without reference to the inclusions). The dispersed phase further contains inclusions of a polypropylene homopolymer. Such inclusions are also observable by the aforementioned TEM method.

Figure 1:
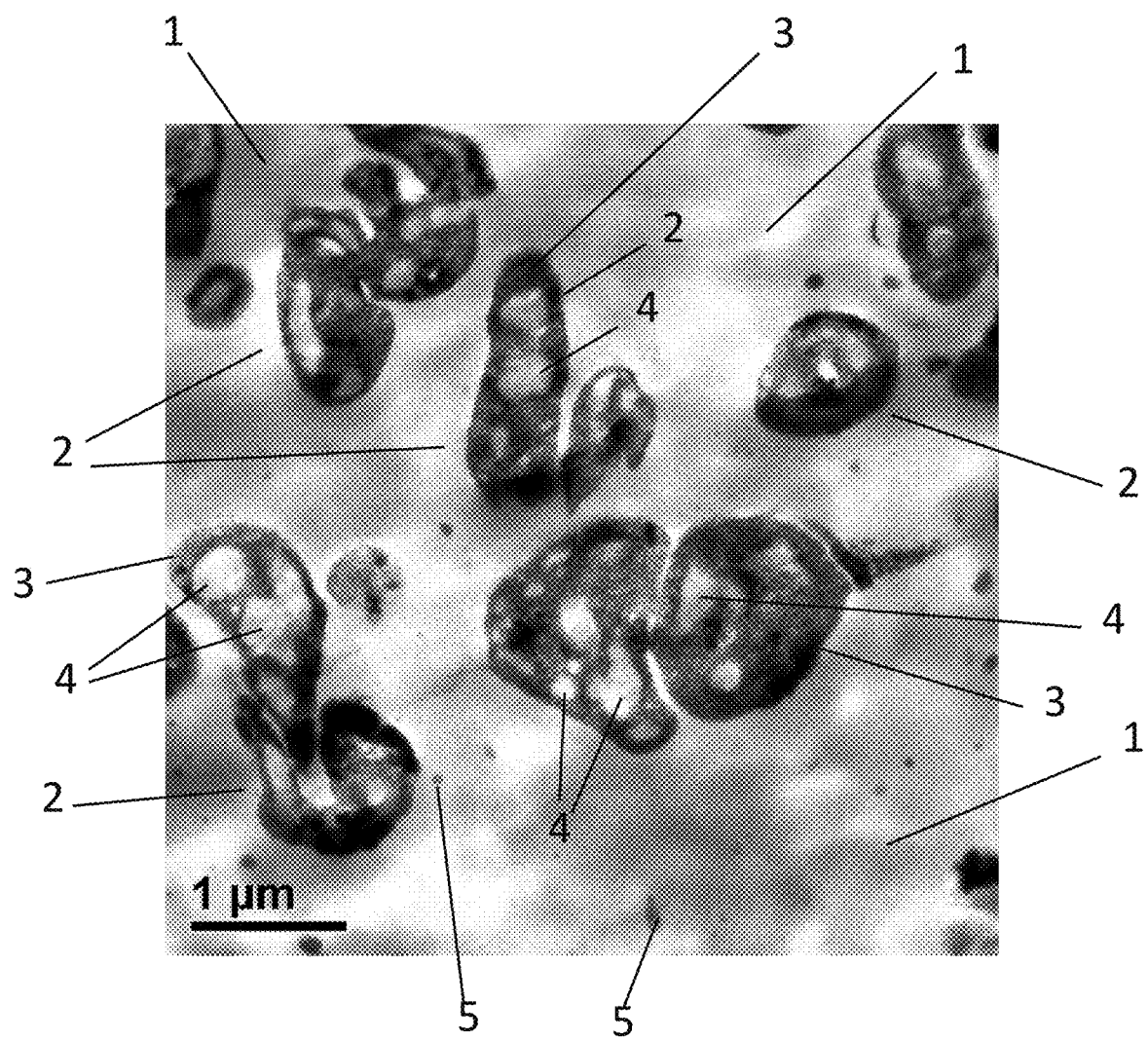
FIG. 1 is a TEM micrograph of a phase-segregated polyolefin suitable for use in the invention in which the dispersed phase contains inclusions of a polypropylene homopolymer.

FIG. 1 is a TEM micrograph of a suitable phase-segregated polyolefin. The copolymer comprises continuous phase 1, in which the dispersed phase is present in the form of domains 2. Domains 2 comprise an ethylene-propylene copolymer 3 having a glass transition of −30° C. or lower (without reference to the inclusions). Glass transition temperatures are measured by differential scanning calorimetry (DSC). The samples are melted, quenched, and then heated at a heating rate of 10° C./min with a sampling interval of 0.1 seconds, the glass transition temperature being taken as the mid-point of the step transition curve.

Domains 2 and 5 together may constitute, for example, 18 to 65% or 25 to 55% of the total mass of the phase-segregated polyolefin. The relative mass of the dispersed phase can be estimated using nuclear magnetic resonance (NMR) spectroscopy methods.

The ethylene-propylene copolymer 3 may constitute, for example, 35 to 90% of the total mass of domains 2. Domains 2 as shown mainly have largest dimensions of 0.5 to 2 μm. Domains 2 further contain inclusions 4 of a polypropylene homopolymer. The polypropylene homopolymer of inclusions 4 may be the same polypropylene homopolymer as contained in continuous phase 1. Inclusions 4 may constitute, for example, 10 to 65% of the total mass of domains 2. As shown in FIG. 1, a small portion (such as up to 25%, up to 10% or up to 5%) of the mass of the dispersed phase may be in the form of smaller domains 5 having largest dimensions of less than 0.5 μm and a glass transition temperature of −30° C. or lower, which smaller domains 5 may lack inclusions 4.

Preferably, at least 95% of the mass of the dispersed phase is in the form of domains having a longest dimension of 0.1 to 5 μm. In some embodiments, at least 95% or at least 98% of the dispersed phase is in the form of domains having a longest dimension of 0.1 to 2.5 μm, and in preferred embodiments at least 95% or at least 98% of the dispersed phase is in the form of domains having a longest dimension of 0.25 to 2 μm.

Continuous phase 1 comprises a polypropylene homopolymer. The polypropylene homopolymer may constitute, for example, 80 to 100%, 90 to 100% or 95 to 100% of the mass of the continuous phase.

The ethylene-propylene copolymer may constitute, for example, 80 to 100%, 90 to 100% or 95 to 100% of the mass of domains 2 (not including the mass of inclusions 4).

Inclusions 4 are or include a polypropylene homopolymer, which may be the same polypropylene homopolymer that forms continuous polyolefin phase 1. The polypropylene homopolymer may constitute, for example, 80 to 100%, 90 to 100% or 95 to 100% of the mass of the inclusions 4.

The polypropylene homopolymer that forms continuous phase 1 and/or inclusions 4 and the ethylene-propylene copolymer in domains 2 may be separate polymers. Alternatively, they may be partially or entirely covalently bonded to each other, such as by grafting or other method.

In other embodiments, the polyolefin comprises (i) 50 to 95 weight percent of one or more polypropylene homopolymer chain segments, based on the weight of the polyolefin, or 43 to 79 mole percent polypropylene homopolymer chain segments based on the mold content of polymerized units of polypropylene in the polypropylene homopolymer chain segments as a percentage of the total mole content of polymerized monomer units in the polyolefin. The polyolefin may comprise at least 55, at least 60 or at least 70 weight percent polypropylene homopolymer chain segments and up to 90, up to 88, up to 85 or up to 82 weight percent of polypropylene homopolymer chain segments.

In some embodiments, the polyolefin comprises (ii) 5 to 50 weight percent of ethylene-containing copolymer chain segments based on the weight of the polyolefin or 21 to 57 mole percent of ethylene-containing chain segments based on the mole content of polymerized monomer units in the ethylene-containing copolymer chain segments as a percentage of the total mole content of polymerized monomer units in the polyolefin. The polyolefin may comprise at least 10, at least 12, at least 15 or at least 18 percent of the ethylene-containing copolymer segments, and up to 45, up to 40 or up to 30 weight percent thereof.

In some embodiments, at least a portion of the ethylene-containing copolymer chain segments comprise polymerized units of ethylene in an amount of at least 45 weight percent based on the weight of the ethylene-containing copolymer chain segments, or at least 55 mole percent based on the mole content of polymerized units of ethylene in the ethylene-containing chain segments as a percentage of the total mole content of polymerized monomer units in the ethylene-containing copolymer chain segments. The ethylene-containing copolymer chain segments may comprise at least 45, at least 50, at least 55 or at least weight percent polymerized units of ethylene, and may contain, for example up to 80, up to 75 or up to 75 weight percent polymerized units of ethylene.

The ethylene-containing copolymer chain segments are copolymers of ethylene and at least one other copolymerizable monomer. The other copolymerizable monomer preferably is propylene. The ethylene-containing copolymer chain segments may be, for example, block, random, pseudo-random, and/or graft copolymers of ethylene and the at least one other copolymerizable monomer. In specific embodiments, the ethylene-containing copolymer chain segments are or include block copolymers of ethylene and propylene.

The content of polymerized ethylene units in the polyolefin may be, for example at least 10, at least 12 or at least 15 weight percent, and for example, up to 30 or up to 25 weight percent, based on the total weight of the polyolefin.

Further suitable polyolefins are described in US 2021/009511 A1 paragraphs [0063] to [0078], which are incorporated herein by reference.

The polyolefin may constitute, for example, at least 80%, at least 90%, at least 95%, at least 98% or at least 99% of the total weight of the starting non-porous polyolefin sheet.

The polyolefin may contain other components as may be useful or desirable. Examples of these include extrusion processing aids such as lubricants and the like; antioxidants, titanium dioxide, UV stabilizers, light stabilizers, thermal stabilizers, pigments or other colorants, antistatic agents, flame retardants, antiblock additives, biocides, and the like. UV stabilizers are preferred additives. Examples of these include various hydroxyphenylbenzotrioles, such as those sold as Tinuvin® 328 or Tinuvin® 329 by BASF; hindered amine stabilizers such as those sold as Tinuvin® 770 or Chimassorb®2020 by BASF. One or more UV stabilizers may be used in conjunction with one or more antioxidants.

Although the polyolefin may contain filler particles, such fillers are preferably absent or, if present, present in only small quantities such as up to 3%, up to 2%, up to 1%, or up to 0.5% of the combined weight of filler particles and the polyolefin. Such fillers are particulate materials that are thermally stable (i.e., do not melt or thermally degrade) under the conditions of the extrusion lamination process. Fillers include both inorganic and organic types, including those described in paragraph [0099] of US 2021/0095110 A1.

The non-woven fabric has an areal weight of 100 to 400 g/m$^2$ as measured according to EN ISO 9864:2016. A preferred areal weight is at least 125 or at least 150 g/m$^2$ and up to 350 or up to 300 g/m$^2$. The fabric thickness is preferably is 0.25 to 0.95 mm under a load of 2 kN/m$^2$, and may be, for example, at least 0.3 or least 0.4 mm and up to 0.9 or up to 0.8 mm, as measured according to EN ISO 9863-1:2005. The non-woven fabric has an elongation to break of 30 to 200% in each of machine and cross directions, as measured according to EN ISO 10319:2015. The non-woven fabric preferably is water-permeable and may have a permeability (VH50) of $5\times10^{-3}$ to $200\times10^{-3}$, especially $10\times10^{-3}$ to $100\times10^{-3}$, or $10\times10^{-3}$ to $50\times10^{-3}$, m/s as measured according to EN ISO 11058:2019.

The non-woven fabric in some embodiments comprises or consists of fibers or filaments that are entangled, spun-bonded and/or melt bonded to form the fabric. The non-woven fabric may be made in a spun-bond, air-laying, spunlaced or melt-bond process, for example.

The fabric is composed of a material that is thermally stable under the conditions of the extrusion lamination step, i.e., the material does not melt, heat soften or degrade such that fabric loses its integrity during the extrusion lamination step. The material may be or include an organic polymer, preferably an organic polymer having a crystalline melting temperature or Vicat softening temperature of at least 80° C., preferably at least 100° C. or at least 125° C. Examples of such polymers include polypropylene, polyesters such as poly(ethylene terephthalate), poly(butylene terephthalate, various polyamides (nylons), poly(lactide), cellulosic fibers such as pulped and extruded cellulose (Lyocell®) cellulose acetate, cellulose diacetate, cellulose triacetate and cellulose acetate butyrate, various acrylate polymers, M5 fiber, polybenzimidazole, polyvinyl alcohol, polyphenylene sulfide, polyacrylonitrile and acrylonitrile copolymers. The fabric may also comprise, for example, carbon, wool, metallic, mineral wool, silk, jute or other natural fibers, provided the fabric has the elongation to break and preferably also the permeability as mentioned above.

A preferred fabric is a polypropylene fabric, a polyethylene terephthalate fabric, or a polypropylene-polyethylene terephthalate fabric. A polypropylene-polyethylene terephthalate fabric may be composed of polypropylene-polyethylene bicomponent fibers, wherein polypropylene forms at least a portion of the surface of the bicomponent fibers. Such bicomponent fibers may be, for example, a sheath-and-core type with a polypropylene sheath, or a side-by-side bicomponent fiber.

A non-porous laminate is produced from the polyolefin and the non-woven fabric. In an extrusion lamination process, the polyolefin is melted, and the melted polyolefin is then forced through a die to form a non-porous polyolefin sheet. This step can be performed using, for example, a single-screw or twin-screw extruder, an accumulating extruder, or other suitable apparatus, equipped with a suitable die such as a slit die or dog-bone die. The polyolefin is heated in the extrusion equipment to a temperature above the crystalline melting temperature of the polypropylene homopolymer of the continuous phase and forced through the die to form a sheet. A preferred temperature is at least 180° C. or at least 200° C. and up to 240° C. or up to 260° C.

The extruded polyolefin sheet preferably has a thickness of at least 250 µm, at least 400 µm or at least 500 µm, or at least 1000 µm, and up to 10 mm, up to 5 mm, up to 2,000 µm or up to 1,500 µm.

The extruded sheet is non-porous. It is preferred to omit blowing agents and/or gasses in the extrusion process to avoid producing pores. For purposes of this invention, a sheet is considered as "non-porous" if, after cooling, it exhibits a water vapor transmission rate (WVTR) of no greater than 2 g/m$^2$-day at 37.8° C., 100% relative humidity, as measured according to ASTM D1249.

The melted non-porous polyolefin sheet is contacted with a surface of the non-woven fabric, to produce a non-porous polyolefin layer on that surface. This step is performed before the sheet has cooled to below its Vicat softening temperature. The contacting step preferably is performed with 30 seconds, more preferably within 10 seconds, within 5 seconds or within 2 seconds from when the sheet exits the extruder die.

The contacting step is performed under mechanical (nipping) pressure such that the non-woven fabric becomes at least partially embedded in the non-porous polyolefin layer. By "embedded" it is meant that all or a portion of the polyolefin penetrates into interstitial spaces in the non-woven fabric, so at least a portion of the non-woven fabric becomes infused with the polyolefin. Mechanical (nipping) pressure is conveniently applied by passing the non-woven fabric and applied polyolefin layer through one or more calendar rollers; however other apparatus such as a double-belt laminator are also suitable. In some embodiments one or more of the calendar rollers may be chilled to simultaneously cool the polyolefin to a temperature below its Vicat softening temperature (such as to 80 to 120° C.) and impregnate the fabric.

The extrusion lamination process may be performed by applying an extruded polyolefin sheet to both sides of the non-woven fabric. In such a case, the opposing polyolefin sheets can be contacted with the non-woven fabric simultaneously or sequentially.

Figure 2:
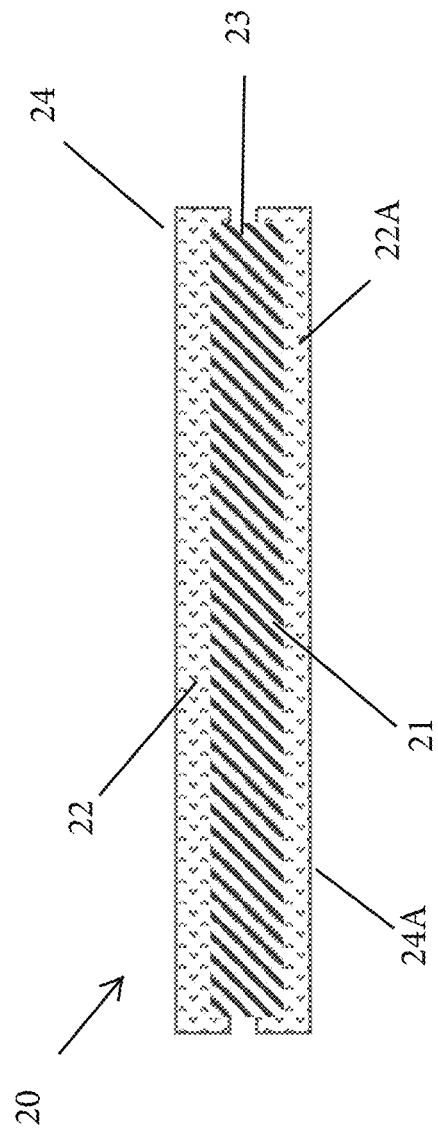
FIG. 2 is a cross-sectional view of a non-porous laminate for cold- and hot-stretching in accordance with the invention.

As shown in FIG. 2, the resulting non-porous laminate 20 includes non-woven fabric 21 and (in the embodiment shown) two polyolefin layers 22 and 22A. As shown, non-woven fabric 21 is partially embedded into each of polyolefin layers 22 and 22A, which a small central section 23 of non-woven fabric 21 being non-infiltrated. In alternative embodiments, the entirely of non-woven fabric 21 is infiltrated by and embedded in either or both of polyolefin layers 22 and 22A. Also as shown, a portion of each of polyolefin layers 22 and 22A respectively extend above and below non-woven fabric 21 to form non-reinforced surface layers 24 and 24A. In alternative embodiments, one or both of those non-reinforced surface layers 24 and 24A are absent, in which case the respective polyolefin layer 22 and/or 22A has entirely penetrated into non-woven fabric 21.

The total thickness of the non-porous laminate is at least 1 mm. It may be at least 1.2 mm, and may be up to, for example, 12.7 mm, up to 6.35 mm, up to 3 mm, up to 2 mm or up to 1.8 mm.

The non-porous laminate thus formed is cooled to a temperature of 50° C. or less before being subjected to the sequential cold and hot stretching process. The cold stretch is performed first, followed by the hot stretch.

The stretching process may be performed in the general manner and conditions described in US 2021/095110 A1. The cold stretching step is performed with the non-porous laminate at a temperature of −20° to 50° C. A preferred lower temperature is 0° C., 10° C. or 15° C., and a preferred upper temperature is up to 35° C., up to 30° C. or up to 25° C. The cold stretch percentage may be, for example, at least 15%, at least 25%, at least 35 or at least 40% and up to 150%, up to 100% or up to 80%. The cold stretching may be performed in a single step or in multiple increments. Stretch percentage is calculated as 100%×[(stretched film length−initial film length)÷initial film length)].

The cold stretched laminate may be annealed prior to performing the subsequent hot stretching step. Such an annealing step is conveniently performed by heating the cold stretched laminate to a temperature of 90 to 150° C., for a period of at least one second, preferably at least 2 seconds. Annealing periods of more than 30 seconds are generally unnecessary. Annealing can fix the pore structure formed in the cold stretching step and also reduce shrinkage. The annealing step preferably is performed immediately after cold stretching while maintaining the cold stretched laminate under tension, so it does not shrink prior to the annealing step being performed. In a continuous process in which the hot stretching is performed immediately after the cold stretch, annealing can take place as the cold stretched laminate is heated to the hot stretch temperature.

The hot stretching step is performed with the laminate at a temperature of greater than 50° C. to 150° C. A preferred lower temperature is at least 90° C. or at least 120° C., and a preferred upper temperature is 140° C. The hot stretching may be performed in a single step or in multiple increments. The hot stretch percentage may be, for example, at least 25%, at least 40%, or at least 50% and up to 400%, up to 300%, up to 200%, up to 150%, up to 100% or up to 80%.

The hot stretched laminate is optionally annealed in the same manner as described with regard to annealing the cold stretched laminate.

Each of the stretching steps may be performed uniaxially or biaxially. Uniaxial stretching may be performed in any direction. When the non-porous laminate is produced by passing the polyolefin sheet and non-woven fabric through an apparatus, the laminate will have a machine direction corresponding to the direction of movement through the apparatus, and a transverse or cross direction which is perpendicular to the machine direction (within the plane of the sheet). Either or both of the stretching steps can be performed uniaxially in the machine direction or in the cross direction. For example, the cold and hot stretching steps both can be performed uniaxially in the same direction, i.e., either the machine or cross direction.

Alternatively, one of the stretching steps can be performed in the machine direction and the other in the cross direction. This has the benefit of better balancing physical properties such as tensile strength and elongation in the machine and cross directions. In an embodiment that lends itself well to continuous operation, the cold stretching step is performed in a cross direction and the hot stretching step is performed in the machine direction.

The laminate may be stretched by simultaneous biaxial stretching, using a biaxial stretching device such as is sold by Iwamoto Seisakusho Co., Kyoto, Japan.

Another suitable stretching apparatus includes one or more sets of sequential driven stretching rollers, each operating at a successively greater speed, such as described in US 2011/095110 A1 FIG. 8 and accompanying text. Such an apparatus is primarily useful for uniaxially stretching the laminate in the machine direction. The sequential driven stretching roller section may be preceded by an unwinding station, from which the laminate is fed into the stretching process, and/or a pre-stretching and/or precooling or preheating section. The sequential driven stretching roller section may be followed by an annealing section and/or a rewinding station at which the stretched laminate is removed from the stretching process.

Another stretching apparatus that permits continuous operation is a tenter frame that includes clips for gripping the sides of the laminate. The clips are mounted on a pair of rails that diverge in the direction of the movement of the laminate through the apparatus. The clips travel along the rails, carrying the laminate, diverging and thus stretching the laminate. This apparatus is particularly well suited for stretching the laminate in the cross direction. As before, the stretching section (i.e., the section that includes the diverging rails, where laminate is stretched) may be preceded by an unwinding station and/or a preheating or precooling station, which may be followed by an annealing section and/or a rewinding section.

Yet another suitable stretching apparatus is a grooved roller stretcher. Such a grooved roller stretcher is particularly useful for stretching the laminate in the cross direction. The grooved roller stretcher comprises interdigitating tooth-and-groove structures through which the laminate is passed. The tooth-and-groove structure may be roller pairs as described, for example, in U.S. Pat. Nos. 4,368,565, 5,028,289 and 6,843,949, US Published Patent Application No. 2006/0148354 and EP 927 096B1. A toothed-and-grooved activation member and moving belt with complementary teeth-and grooves such as described in U.S. Pat. No. 8,337,190. The grooved roller stretcher may include multiple tooth-and-groove structures in series. The laminate is fed into the grooved roller stretcher and transported through the tooth-and-grooved structures, where the laminate is stretched transversely to the direction of its movement. The laminate is thereafter removed from the apparatus. A stretching operation performed in a grooved roller stretcher is conveniently performed in a continuous manner by continuously transporting a length of the laminate through the tooth-and-grooved structures.

In one embodiment of the invention, the reinforced microporous polymer sheet is produced in a continuous process comprising the steps of a-1) continuously extruding the polyolefin into a non-porous sheet, a-2) continuously contacting the non-porous sheet with the non-woven fabric prior to cooling the non-porous sheet to a temperature below its Vicat softening temperature to produce the non-porous laminate, b-1a) continuously cooling the non-porous laminate to the cold stretching temperature, then b-1b) cold stretching the non-porous laminate in the transverse direction, then b-2a) continuously heating the cold stretched laminate to the hot stretch temperature and then b-2b) continuously hot stretching the cold stretched laminate in the machine direction to produce the reinforced microporous polymer sheet. Each of steps a-1), a-2), b-1a, b-1b), b-2a and b-2b) can be performed in the manner described hereinabove. Such a continuous process may include optional steps such as continuously annealing the cold-stretched laminate, continuously annealing the reinforced microporous polymer sheet, and/or continuously extruding a second layer of polypropylene copolymer and continuously contacting such second layer to an opposing side of the non-woven fabric.

Such a continuous process can be performed on an apparatus that comprises, in series:
I. An extrusion laminating station that includes I-a) an extruder equipped with a die adapted to produce a polyolefin sheet, I-b) a laminator adapted to continuously contact the polyolefin sheet with a non-woven fabric and continuously mechanically compress the polyolefin sheet and non-woven fabric together to produce the non-porous laminate and I-c) a feeding apparatus for supplying the non-woven fabric to the laminator;
II. A cold-stretching station adapted to continuously receive the non-porous laminate from the extrusion laminating apparatus and continuously cold-stretch the non-porous laminate in the cross direction;
III. A hot-stretching station adapted to continuously receive the cold-stretched laminate, continuously heat the cold-stretched laminate to the hot-stretching temperature, continuously hot stretch the laminate to form the microporous reinforced polyolefin sheet, and optionally continuously anneal the microporous reinforced polymer sheet and
IV. A cooling station adapted to continuously receive the microporous reinforced polymer sheet, and continuously cool it to a temperature below 50° C. A preferred apparatus for continuously manufacturing the microporous polymer sheet is showing schematically in FIG. 3. Apparatus 30 includes extrusion lamination section 70. Extrusion lamination section 70 includes first extruder 31 and accompanying die 32, which are adapted to continuously extrude polyolefin sheet 51. Nonwoven fabric 33 is continuously fed from feeding apparatus 50 and carried into first laminator 60, which in this embodiment takes the form of calendar rollers 34. Therein, nonwoven fabric 33 is brought into contact with polyolefin sheet 51 at calendar rollers 34 at a point at which polyolefin sheet 51 remains at a temperature above its Vicat softening temperature. Calendar rollers 34 preferably mechanically compress polyolefin sheet 51 and nonwoven fabric 33 together to force at least a portion of polyolefin sheet 51 into interstitial spaces in nonwoven fabric 33 to form non-porous laminate 52. Calendar rollers 34 may be heated or cooled if desired. It is often preferred to heat calendar rollers 34 if an optional second polyolefin sheet is to be applied.

In the embodiment shown, lamination section 70 includes optional second extruder 31A and associated second die 32A, and optional second laminator 60A. Second laminator 60A as shown takes the form of calendar rollers 35, although equivalent apparatus as described above is also useful. Second extruder 31A and second die 32A continuously produce an optional polyolefin second sheet which is continuously contacted with non-porous laminate 52 at second laminator 60A, on the opposite side from polyolefin sheet 51, to form a sandwich structure. Second laminator 60A mechanically compresses non-porous laminate 52 and the second polyolefin sheet together while the second polyolefin sheet remains at a temperature above its Vicat softening temperature. Calendar rollers 35 may be heated or cooled.

Non-porous laminate 52 is then continuously conducted to cold stretching station 36 where it is cold stretched in the cross (transverse) direction. Before reaching cold stretching station 36, the non-porous laminate is brought to a cold stretching temperature as described before. This can be done, for example, by chilling calendar rollers 34 and/or 35, and/or at a separate cooling station located upstream of cold stretching section 36 (and after the last extrusion lamination station). Cooling can also be performed in cold stretching section 36 itself by, for example, chilling interdigitating tooth-and-groove structures 37A/B.

Cold stretching station 36 includes one or more interdigitating tooth-and-groove structures 37A/B through which non-porous laminate 52 is continuously passed at the cold stretching temperature and becomes stretched in the cross direction to produce cold stretched laminate 61. As shown, cold stretching section 36 includes two interdigitating tooth-and-groove structures 37A/B. Fewer or more can be provided as necessary or desirable.

Cold stretched laminate 61 is then continuously conducted through hot stretching section 62 where it is brought to the hot stretching temperature, continuously stretched in the machine direction, and optionally annealed. In the embodiment shown, hot stretching section 62 includes a preheating section, which includes rollers 40, 41 and 42. Rollers 40, 41 and/or 42 are heated to increase the temperature of the cold stretched laminate to the hot-stretching temperature. The number of preheating rollers 40, 41 and 42 is arbitrarily shown as three in FIG. 3; more or fewer can be provided as may be necessary or desirable. As shown, each preheating roller 40, 41 and 42 has an optional associated guide or drive roller 40A, 41A and 42A, which may function to guide cold-stretched laminate 61 against the associated heating roller and/or power the associated heating roller and therefore help pull cold-stretched laminate 61 into and/or through hot stretching section 62. Cold-stretched laminate 61 may be corrugated after passing through interdigitating tooth-and-groove structures 37A/B; guide or drive rollers 40A, 41A and/or 42A may further serve to press cold-stretched laminate 61 firmly against the corresponding preheating roller, thereby flattening cold-stretch laminate 61, removing the corrugations and reducing or preventing shrinkage in the cross direction.

Annealing may occur in the preheating section of hot stretching section 62.

Figure 3:
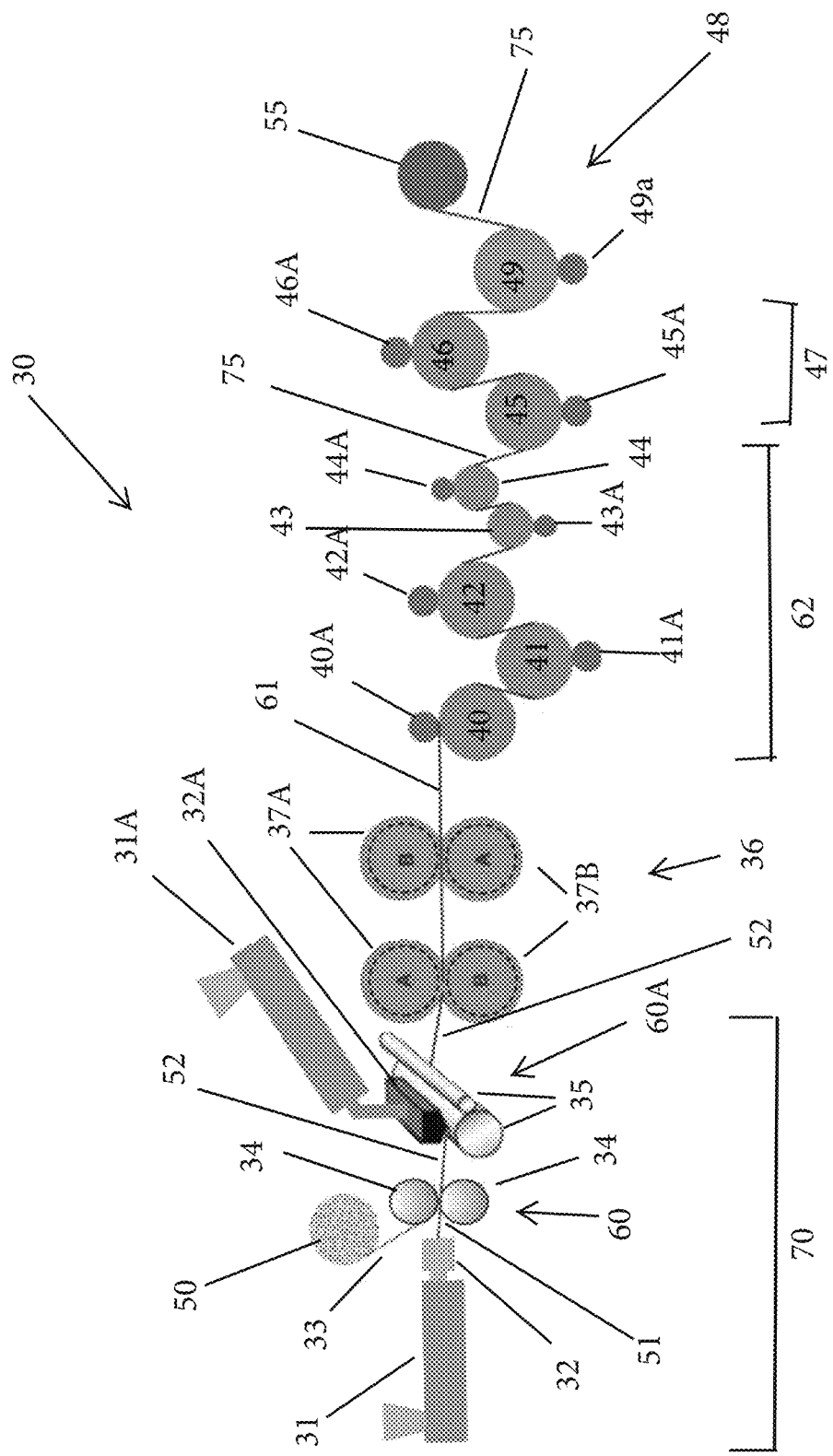
FIG. 3 is a schematic view of a continuous process of the invention.

In the embodiment shown in FIG. 3, hot stretching section 62 includes stretching rollers 43 and 44. Two stretching rollers are shown in FIG. 3; fewer or more may be provided. As shown, each stretching roller 43 and 44 has an optional associated guide or drive roller 43A and 44A, which may function to guide cold-stretched laminate 61 against the associated stretching roller and/or rotate the associated stretching roller and therefore help pull cold-stretched laminate 61 through hot stretching section 62. Stretching rollers 43 and 44 may be heated.

Each successive stretching roller is operated at a greater circumferential speed than the preceding stretching roller. The first stretching roller operates at a greater circumferential speed than the immediately preceding upstream roller (as shown, preheating roller 42). The rate at which the laminate travels through hot stretching section 62 therefore increases as it passes each successive stretching roller, which causes the laminate to become stretched in the machine direction to produce reinforced microporous copolymer sheet 75.

As shown in FIG. 3, reinforced microporous polyolefin sheet 75 is then continuously passed through an optional annealing section 47. As shown, annealing section 47 includes annealing rollers 45 and 46, each associated with an optional drive or guide roller 45A and 46A. As before, more or fewer annealing rollers may be present. The circumferential speeds of rollers 45 and 46 preferably are at least as great as that of the last stretching roller 44 so as to maintain sufficient tension on reinforced microporous copolymer sheet 75 that it does not contract in the machine direction. The temperature of reinforced microporous copolymer sheet 75 in annealing section 47 is maintained within an annealing temperature range as described before.

Reinforced microporous copolymer sheet 75 exiting from hot stretching section 62 (or annealing section 47, if present) then passes through cooling station 48 where it is cooled to a temperature below 50° C. In the embodiment shown, cooling station 48 includes chill roller 49 and optional associated guide or drive roller 49A. Multiple chiller rollers 49 may be present. If no annealing section 47 is present, the circumferential speed of roller 49 preferably is at least as great as that of the last stretching roller so as to maintain sufficient tension on reinforced microporous copolymer sheet 75 that it does not contract in the machine direction.

Cooled reinforced microporous copolymer sheet 75 exiting cooling station 48 is then continuously removed from the process, such as by winding it on roller 55 to produce roll-stock.

The resulting reinforced microporous copolymer sheet has a thickness of at least 1 mm. The thickness may be at least 1.2 mm, and may be, for example, up to 12.7 mm, up to 6.35 mm, up to 3 mm, up to 2 mm or up to 1.8 mm.

The reinforced microporous copolymer sheet preferably exhibits a water vapor permeance of at least 50, at least 80, at least 100, at least 120 or at least 200 g/m$^2$-day, as measured according to ASTM E96/E96M (ISO12572:2001). The water vapor permeance may be, for example, up to 1000, up to 500 or up to 350 g/m$^2$-day.

The reinforced microporous copolymer sheet preferably passes the water tightness test of EN1928:2000 Method B without leakage under conditions of 0.3 MPa pressure for at least 30 minutes.

The high vapor pressure permeance and excellent water tightness are important and unexpected advantages of the invention. Surprisingly, the presence of the non-woven fabric does not inhibit stretching and micropore formation, and also adheres strongly to the polypropylene copolymer so as to avoid tearing away and forming more macroscopic defects in the stretched material.

The reinforced microporous copolymer sheet preferably exhibits a tear strength in at least one direction of at least 200 N, more preferably at least 250 N, as measured according to EN12310-2:2000. More preferably the tear strength is at least 200 N, more preferably at least 250 N, in each of machine and cross directions.

The reinforced microporous copolymer sheet preferably exhibits a tensile strength at peak load of at least 1250 N/5 cm, more preferably at least 1500 or at least 1750 N/5 cm, in at least one direction, as measured according to ASTM D5034-09 at a crosshead speed of 30 cm/minute. The reinforced microporous copolymer sheet may exhibit a tensile strength at peak load of at least 1250 N/cm, at least 1500 N/cm or at least 1500 N/cm in one direction (typically the machine direction) and at least 500 N/cm in an orthogonal direction (typically the cross direction). The elongation at maximum force, measured in the same manner, is preferably at least 15% in both the machine and cross directions.

Another advantage of the reinforced microporous copolymer sheet is that it welds easily and securely to itself, despite the presence of the embedded non-woven fabric. Bond strength is determined by bonding two reinforced microporous polyolefin sheets together using a hot air welder operated at a set temperature of 250° C., followed by measuring the peel strength of the resulting bond according to EM12316-2:2000. The peel force at the welded typically is at least 2 N/mm.

The reinforced microporous copolymer sheet is useful as or as a component of a water-proofing membrane in applications that require breathability, especially water vapor transmission. Roof membranes represent an application for which the reinforced microporous copolymer sheet is particularly suitable. Specific examples of roof membranes for which the reinforced microporous copolymer sheets are useful include metal roof membranes, temporary roof membranes, and concrete roof membranes, especially for lightweight concrete roof membranes.

The reinforced microporous copolymer sheet is also suitable for use as or as a component of packaging, personal care items such as diapers and adult incontinence devices, protective wear such as medical drapes, medical gowns, surgical suits, air masks and the like.

EXAMPLES

The following examples are provided to illustrate the invention, but these are not intended to limit the scope thereof. All parts and percentages are by weight unless otherwise indicated.

The Polyolefin is a phase-segregated copolymer available as PP C7054-07NA from Braskem PP Americas. It contains 67.1% propylene homopolymer and 32.9% of a 50/50 by weight copolymer of ethylene and propylene ($T_g$<−50° C.). On TEM imaging, the Polyolefin exhibits a continuous phase that contains polypropylene homopolymer, and a dispersed phase that contains ethylene-propylene copolymer in the form of discrete domains mainly having longest dimensions of up to 2 μm, as shown in FIG. 1. Inclusions of the polypropylene homopolymer are contained within the ethylene-propylene copolymer domains. The Polyolefin has a density of 0.9 g/cm³ and a melt index of 7 g/10 minutes (230° C./2.16 kg), as reported by its manufacturer.

The PP-PET is a non-woven fabric is made from core-shell polypropylene-poly(ethylene terephthalate) fibers. The fabric has an areal density of 157 g/m² and thickness of 0.762 mm under a load of 2 kN/m². Its tensile strength is 550 N/5 cm in the machine direction and 434 N/5 cm in the cross direction. Its elongation is 75% in the machine direction and 82% in the cross direction.

Examples 1-4

The Polyolefin is blended with a UV stabilizer masterbatch in single-screw extruder with a 158 cm die and extruded into 558-μm (22 mil) and 762-μm (30 mil) non-porous sheets that contain 0.315% of the UV stabilizer. In each case, the extrudate is passed through three chill rollers set at 119° C., 120° C. and 88° C. to produce a smooth, uniform surface. In each case, the PP-PET non-woven fabric is fed from an unwinding station to the first chill roll, where the extrudate and PP-PET nonwoven are contacted. The gap between the successive chill rolls is set to mechanically compress the extrudate and PP-PET non-woven and force a portion of the extrudate into interstitial spaces in the fabric. This produces an intermediate laminate having the Polyolefin on one side of the non-woven fabric.

The Polyolefin is then applied to the opposing side of the non-woven fabric in the same manner, substituting the intermediate laminate for the PP-PET non-woven fabric. This produces Non-Porous Laminates 1 and 2 for subsequent stretching. Non-Porous Laminate 1 is made with two layers of the 558 μm Polyolefin sheet, and Non-Porous Laminate 2 is made with two layers of the 762 μm Polyolefin sheet. Non-Porous Laminate 1 has a thickness of about 1.15 mm; that of Non-Porous Laminate 2 is about 1.6 mm.

Cold-Stretched Laminate 1 is made by cold stretching Non-Porous Laminate 1 to 125% of its original length (25% stretch) in the machine direction by passing it through a series of eleven rollers as generally illustrated in FIG. 8 of US 2021/0095110 A1. Stretching temperature is 20-23° C. The laminate turns white as it passes through the stretching step, indicating pore formation. The last three rollers are heated to 140° C. to heat the stretched sheet and thermally anneal it, fixing the pore structure and dimensions.

Cold-Stretched Laminate 2 is made in the same manner, except Non-Porous Laminate 1 is stretched to 140% of its original length (40% stretch).

Cold-stretched Laminates 3 and 4 are made in the same manner as Cold-Stretched Laminates 1 and 2, respectively, using Non-Porous Laminate 2 instead of Non-Porous Laminate 1.

Each of Cold-Stretched Laminates 1-4 are then hot-stretched by 50% at a stretching temperature of 135° C. in the machine direction on the same apparatus, to produce Examples 1-4, respectively. Properties are determined according to test methods described before and are as reported in Table 1.

TABLE 1

| Ex. No. | Stretch % Cold/Hot | Thickness, mm | Tens. Str., N/5 cm MD/CD | Elong. At Max. Force, % MD/CD | Peel Force N/mm | Tear Str., N MD/CD | WVP, g/m²-day | Water tight |
|---|---|---|---|---|---|---|---|---|
| 1 | 25/50 | 1.15 | 1850/733 | 19/94 | 2.5 | 247/360 | 120 | Pass |
| 2 | 40/50 | 1.16 | 1759/687 | 14/75 | ND | ND | 258 | Pass |
| 3 | 25/50 | 1.51 | 1992/952 | 15/78 | 2.5 | 268/297 | 95 | Pass |
| 4 | 40/50 | 1.60 | 2187/931 | 18/86 | ND | ND | 170 | Pass |

MD = machine direction. CD = cross direction. WVP is water vapor permeance. A "pass" watertightness rating indicates no water leakage. Tensile strength and elongation are reported at yield.

These examples demonstrate that reinforced microporous polyolefin sheets can be made successfully in a sequential cold/hot stretching process, despite the presence of the embedded non-woven fabric. The samples retain good tensile, elongations and tear properties, are breathable (as indicate by the water vapor permeance values, yet remain barriers to liquid water. These results indicate excellent adhesion of the propylene copolymer to the fibers of the non-woven fabric during the stretching process.

Examples 5-7

Non-Porous Laminates 3-5 are made in the same general manner as Non-Porous Laminates 1 and 2, except the polyolefin sheet thickness is about 840 μm and the amount of UV stabilizer is varied from 0% in Non-Porous Laminate 3 to 1.5% and 2.5% in Non-Porous Laminates 4 and 5. Non-Porous Laminates 3, 4 and 5 all have thicknesses of about 1725 μm.

Examples 5-7 are made by sequentially cold and hot stretching Non-Porous Laminates 3-5, respectively, in the same general manner as described for Examples 1-4. The laminates are cold stretched by 50% at 20-23° C., and hot stretched by 50% at 135° C.

Porosity and average pore diameter are measured by the mercury intrusion porosimetry method of ASTM D4404-10. Tensile, elongation at maximum force and water vapor permeance are also measured using methods described before. Results are as indicated in Table 2.

TABLE 2

| Ex. No. | Stretch % Cold/Hot | Thickness, mm | Porosity, % | Average Pore diameter, (4 V/A, nm) | Tens. Str., N/5 cm MD/CD | Elong. At Max. Force, % MD/CD | WVP, g/m²-day |
|---|---|---|---|---|---|---|---|
| 5 | 50/50 | 1.74 | 31.1 | 36.5 | 2127/983 | 13/62 | 71 |
| 6 | 50/50 | 1.62 | 35.3 | 43.0 | 2193/1010 | 25/90 | ND |
| 7 | 50/50 | 1.64 | 37.6 | 44.5 | 2354/833 | 14/105 | 170 |

MD = machine direction. CD = cross direction. WVP is water vapor permeance. A "pass" watertightness rating indicates no water leakage. Tensile strength and elongation are reported at yield. ND—not determined.

These thick, reinforced laminates are successfully stretched to create porosity while retaining desirable mechanical properties. All are breathable and all pass the water tightness test.

Examples 8-12

Non-Porous Laminates 3, 4 and 5 are cold stretched by 40% in the general manner described in previous examples. The resulting cold stretched laminates are then hot stretched in the transverse direction on a continuous Marshall & Williams Plastics transverse direction orientation (TDO) apparatus, at a stretching temperature of 140° C., to produce Examples 8-12. Non-Porous Laminate 3 is used to produce Example 8; Non-Porous Laminate 4 is used to produce Example 9 and Non-Porous Laminate 5 is used to produce Examples 10-12. The amount of transverse hot stretching is indicated in Table 3.

For comparison, a 1780 μm sheet of the Polyolefin is extruded and then subjected to cold stretching by 40% in the manner described before, followed by hot stretching by 25%-50% in the transverse direction as described for Examples 8-12. This sample is designated Comparative Sample A.

Tensile strength, elongation at maximum force and WVP are measured as described before. Results are as indicated in Table 3.

TABLE 3

| No. | Non-Porous Laminate | Stretch % Cold/Hot | Thickness, mm | Tens. Str., N/5 cm MD/CD | Elong. At Max. Force, % MD/CD | WVP, g/m²-day |
|---|---|---|---|---|---|---|
| 8 | 3 | 40/35 | 1.67 | 1512/1210 | 37/11 | 961 |
| 9 | 4 | 40/35 | 1.58 | 1583/1124 | 41/12 | ND |
| 10 | 5 | 40/25 | 1.69 | 1667/1282 | 34/15 | 307 |
| 11 | 5 | 40/35 | 1.67 | 1488/1259 | 40/11 | 809 |
| 12 | 5 | 40/50 | 1.66 | 1326/1225 | 49/11 | 1438 |
| A* | N/A | 40/25 | 1.68 | 1210/1103 | 71/37 | 985 |

MD = machine direction. CD = cross direction. WVP is water vapor permeance. Tensile strength and elongation are reported at yield.

As shown by the WVP results, the reinforced non-porous laminates, when stretched, produce microporous sheets having water vapor permeances comparable to that seen when the non-reinforced sheet (Comp. A) is stretched. Tensile strengths are increased in Examples 8-12 relative to Comp. A. As the tensile data shows, stretching biaxially balances the properties in the machine and cross directions.

Comparative Sample B

Example 1 is repeated, replacing the PP-PET fabric with a PET mesh (9 mm×9 mm) from Zhejiang Minglong Jibu Co., Ltd. The PET mesh has an elongation to break of 18% in the machine direction and 21.2% in the cross direction. The non-porous laminate produced using the PET mesh did not turn white in the MDO cold stretching step, indicating that pores did not form. The laminate broke during the MDO hot stretching step.

Comparative Samples C and D

Sample C: The Polyolefin is extruded into 500 μm sheets. The non-porous sheet is sequentially cold stretched by 20% in the machine direction and then hot stretched by 100% in the machine direction at 125° C. using the general method described for Examples 1-4. The sheets are treated with a corona discharge. The stretched sheets are bonded to the PP-PET non-woven fabric with a polyurethane adhesive by a thermal lamination process to form a 1.5 mm thick sandwich structure. Water vapor permeability is only 113 g/m²-day and the microporous sheet bonds poorly to itself, exhibiting a peel strength of less than 2 N/mm.

Sample D: Sample C is repeated, replacing the polyurethane glue with a polyolefin hot melt adhesive. This sample fails heat aging tests (116° C. for 672 hours) due to the low melting temperature of the polyolefin adhesive.

Comparative Samples E and F

Sample E: The Polyolefin is extruded into 635 μm and 752 μm sheets. The non-porous sheet is sequentially cold stretched by 20% in the machine direction and then hot stretched by 100% in the machine direction at 125° C. using the general method described for Examples 1-4. The stretched sheets are ultrasonically welded to the PP-PET non-woven fabric with a polyurethane adhesive to form a 1.5 mm thick microporous sandwich structure. Large amounts of ultrasonic energy are needed to produce the welds, and large indentation spots are produced at the weld areas. These indentation spots have very low mechanical strength.

Sample F: Sample E is repeated, replacing the PP-PET non-woven fabric with the PET mesh described in Comparative Sample B. The resulting microporous structure exhibits high water vapor permeance, but cannot pass the water tightness test. Peel strength also is very poor, being less than 0.5 N/mm.

What is claimed is:

1. A method for forming a reinforced microporous polyolefin sheet, comprising the steps of:
   a) extrusion laminating a non-porous sheet of a polyolefin onto at least one side of a non-woven fabric to produce a non-porous laminate having a thickness of at least 1 mm, the non-porous laminate comprising the non-woven fabric at least partially embedded in the polyolefin, then
   b) subjecting the non-porous laminate to sequential stretching steps to produce micropores in the polyolefin, the stretching steps comprising
      1) At least one cold stretching step at a temperature in the range of −20° C. to 50° C. and
      2) At least one hot stretching step at a temperature greater than 50° C. and up to 150° C.,
         wherein the non-woven fabric has an area weight of 100 to 400 g/m², a thickness of 0.25 to 0.95 mm under a load of 2 kN/m², and an elongation to break of 30 to 200% in each of machine and cross directions and
         wherein the polyolefin is a phase-segregated polymer that comprises a continuous phase comprising a polypropylene homopolymer, and a dispersed phase comprising an ethylene-propylene copolymer having a glass transition temperature of −30° C. or lower, the dispersed phase further containing inclusions of a polypropylene homopolymer.

2. A method for forming a reinforced microporous polyolefin sheet, comprising the steps of:
   a) extrusion laminating a non-porous sheet of a polyolefin onto at least one side of a non-woven fabric to produce a non-porous laminate having a thickness of at least 1 mm, the non-porous laminate comprising the non-woven fabric at least partially embedded in the polyolefin, then
   b) subjecting the non-porous laminate to sequential stretching steps to produce micropores in the polyolefin, the stretching steps comprising
      1) At least one cold stretching step at a temperature in the range of −20° C. to 50° C. and
      2) At least one hot stretching step at a temperature greater than 50° C. and up to 150° C.,
         wherein the non-woven fabric has an area weight of 100 to 400 g/m², a thickness of 0.25 to 0.95 mm under a load of 2 kN/m², and an elongation to break of 20 to 200% in each of machine and cross directions and
         wherein the polyolefin comprises
         (i) 50 to 95 weight percent of one or more polypropylene homopolymer chain segments, based on the weight of the polyolefin, or 43 to 79 mole percent polypropylene homopolymer chain segments based on the mold content of polymerized units of polypropylene in the polypropylene homopolymer chain segments as a percentage of the total mole content of polymerized monomer units in the polyolefin and
         (ii) 5 to 50 weight percent of ethylene-containing copolymer chain segments based on the weight of the polyolefin or 21 to 57 mole percent of ethylene-containing chain segments based on the mole content of polymerized monomer units in the ethylene-containing copolymer chain segments as a percentage of the total mole content of polymerized monomer units in the polyolefin,
         wherein at least a portion of the ethylene-containing copolymer chain segments comprise polymerized units of ethylene in an amount of at least 45 weight percent based on the weight of the ethylene-containing copolymer chain segments, or at least 55 mole percent based on the mole content of polymerized units of ethylene in the ethylene-containing chain segments as a percentage of the total mole content of polymerized monomer units in the ethylene-containing copolymer chain segments.

3. The method of claim 1 wherein step a) includes a step of compressing the non-porous sheet of polyolefin and the non-woven fabric together to infiltrate interstitial openings in the non-woven fabric with the polyolefin.

4. The method of claim 1 wherein step a) includes a step a-1) of extrusion laminating a first non-porous layer of the polyolefin to a first side of the non-woven fabric and a step a-2) of extrusion laminating a second non-porous layer of the polyolefin to a second side of the non-woven fabric, steps a-1) and a-2) being performed simultaneously or sequentially.

5. The method of claim 1 wherein the non-porous laminate is cold-stretched in a transverse direction.

6. The method of claim 1 wherein the non-porous laminate is cold-stretched in a machine direction.

7. The method of claim 1 wherein the cold stretched laminate is hot stretched in a transverse direction.

8. The method of claim 1 wherein the cold stretched laminate is hot stretched in a machine direction.

9. The method of claim 1 wherein:
   step a) includes
      a-1) continuously extruding the polyolefin into a non-porous sheet, and
      a-2) continuously contacting the non-porous sheet with the non-woven fabric prior to cooling the non-porous sheet to a temperature below its Vicat softening temperature to produce the non-porous laminate;
   step b-1) includes
      b-1a) continuously cooling the non-porous laminate to the cold stretching temperature and then
      b-1b) continuously cold stretching the non-porous laminate in the transverse direction; and
   step b-2) includes
      b-2a) continuously heating the cold stretched laminate to the hot stretch temperature and then b-2b) continuously hot stretching the cold stretched laminate to produce the reinforced microporous polymer sheet.

10. The method of claim 9 further comprising the steps of:
prior to step b-2)
continuously annealing the cold-stretched laminate, and,
after step b),
continuously annealing the reinforced microporous polymer sheet and/or continuously extruding a second sheet of polyolefin and continuously contacting such second sheet to an opposing side of the non-woven fabric.

11. The method of claim 9 wherein step b-1b) is performed by passing the non-porous laminate through a grooved stretcher that comprises interdigitating tooth-and-groove structures.

12. The method of claim 9 wherein step b-1b) is performed by mounting the non-porous laminate onto a tenter frame that includes clips that grip the sides of the non-porous laminate, the clips being mounted on a pair of rails that diverge in a machine direction.

13. The method of claim 2 wherein step a) includes a step of compressing the non-porous sheet of polyolefin and the non-woven fabric together to infiltrate interstitial openings in the non-woven fabric with the polyolefin.

14. The method of claim 2 wherein step a) includes a step a-1) of extrusion laminating a first non-porous layer of the polyolefin to a first side of the non-woven fabric and a step a-2) of extrusion laminating a second non-porous layer of the polyolefin to a second side of the non-woven fabric, steps a-1) and a-2) being performed simultaneously or sequentially.

15. The method of claim 2 wherein the non-porous laminate is cold-stretched in a transverse direction.

16. The method of claim 2 wherein the non-porous laminate is cold-stretched in a machine direction.

17. The method of claim 2 wherein the cold stretched laminate is hot stretched in a transverse direction.

18. The method of claim 2 wherein the cold stretched laminate is hot stretched in a machine direction.

19. The method of claim 2 wherein:
step a) includes
a-1) continuously extruding the polyolefin into a non-porous sheet, and
a-2) continuously contacting the non-porous sheet with the non-woven fabric prior to cooling the non-porous sheet to a temperature below its Vicat softening temperature to produce the non-porous laminate;
step b-1) includes
b-1a) continuously cooling the non-porous laminate to the cold stretching temperature and then
b-1b) continuously cold stretching the non-porous laminate in the transverse direction; and
step b-2) includes
b-2a) continuously heating the cold stretched laminate to the hot stretch temperature and then
b-2b) continuously hot stretching the cold stretched laminate to produce the reinforced microporous polymer sheet.

20. The method of claim 19 further comprising the steps of:
prior to step b-2)
continuously annealing the cold-stretched laminate, and,
after step b),
continuously annealing the reinforced microporous polymer sheet and/or continuously extruding a second sheet of polyolefin and continuously contacting such second sheet to an opposing side of the non-woven fabric.

21. The method of claim 19 wherein step b-1b) is performed by passing the non-porous laminate through a grooved stretcher that comprises interdigitating tooth-and-groove structures.

22. The method of claim 19 wherein step b-1b) is performed by mounting the non-porous laminate onto a tenter frame that includes clips that grip the sides of the non-porous laminate, the clips being mounted on a pair of rails that diverge in a machine direction.

\* \* \* \* \*